United States Patent
Chen et al.

(10) Patent No.: US 9,685,138 B2
(45) Date of Patent: Jun. 20, 2017

(54) BRIGHTNESS CONTROLLING METHOD WITH BRIGHTNESS SYNCHRONIZING FUNCTIONALITY AND ALL-IN-ONE COMPUTER IMPLEMENTING THE SAME

(71) Applicant: PEGATRON CORPORATION, Taipei (TW)

(72) Inventors: Ke-Ming Chen, Taipei (TW); Chien-Hua Huang, Taipei (TW)

(73) Assignee: Pegatron Corporation, Taipei (TW)

( * ) Notice: Subject to any disclaimer, the term of this patent is extended or adjusted under 35 U.S.C. 154(b) by 0 days.

(21) Appl. No.: 14/693,443

(22) Filed: Apr. 22, 2015

(65) Prior Publication Data

US 2015/0332625 A1    Nov. 19, 2015

(30) Foreign Application Priority Data

May 14, 2014 (TW) .............................. 103117045 A (51) Int. Cl.
G09G 5/10 (2006.01)
G06F 3/14 (2006.01)
G09G 5/00 (2006.01)

(52) U.S. Cl.
CPC ............... *G09G 5/10* (2013.01); *G06F 3/14* (2013.01); *G09G 5/003* (2013.01); *G09G 2320/0626* (2013.01); *G09G 2320/08* (2013.01); *G09G 2370/04* (2013.01)

(58) Field of Classification Search
CPC ..... H04N 21/485; H04N 5/44513; H04N 5/57
See application file for complete search history.

(56) References Cited

U.S. PATENT DOCUMENTS

| 5,386,247 A | 1/1995 | Shafer et al. |
| 2008/0062105 A1* | 3/2008 | Han .................... H05B 41/3927 345/90 |
| 2009/0058887 A1* | 3/2009 | Lin ........................... G06F 3/14 345/690 |
| 2010/0205336 A1 | 8/2010 | Kakish |

(Continued)

FOREIGN PATENT DOCUMENTS

KR    10-2003-0094853 A    12/2003

*Primary Examiner* — Andrew Sasinowski
*Assistant Examiner* — Chun-Nan Lin
(74) *Attorney, Agent, or Firm* — Muncy, Geissler, Olds & Lowe, P.C.

(57) ABSTRACT

A brightness controlling method for an all-in-one computer is provided. The all-in-one computer includes an on-screen display adjusting unit having a first brightness value, an operating system having a first system brightness value, a control unit and a scaler. The brightness controlling method includes the following steps. First, the first brightness value is adjusted to a second brightness value or the first system brightness value is adjusted to a second system brightness value. Then, when the first brightness value is adjusted to the second brightness value, the control unit synchronizes the first system brightness value to the second brightness value; when the first system brightness value is adjusted to the second system brightness value, the scaler adjusts the first brightness value to the second system brightness value. The invention also provides an all-in-one computer implementing the brightness controlling method.

17 Claims, 4 Drawing Sheets

(56) References Cited

U.S. PATENT DOCUMENTS

2014/0198137 A1* 7/2014 Feng .................... G09G 3/3406
                                                    345/690
2014/0368525 A1* 12/2014 Faaborg .................. G09G 5/02
                                                    345/589

* cited by examiner

BRIGHTNESS CONTROLLING METHOD WITH BRIGHTNESS SYNCHRONIZING FUNCTIONALITY AND ALL-IN-ONE COMPUTER IMPLEMENTING THE SAME

CROSS-REFERENCE TO RELATED APPLICATIONS

This Non-provisional application claims priority under 35 U.S.C. §119(a) on Patent Application No(s). 103117045 filed in Taiwan, Republic of China on May 14, 2014, the entire contents of which are hereby incorporated by reference.

BACKGROUND

Technology Field

The disclosure relates to a brightness controlling method and, in particular, to a brightness controlling method having brightness synchronizing functionality.

Related Art

Currently, computers are widely used in various fields. Due to the popularity from personal computers to industrial computers, the computer has become an indispensable tool for modern people.

The development of semiconductor manufacturing process promotes the miniaturization of components and results in the appearance of desktop-type all-in-one computer on the market. To call a computer "all-in-one" means that the host and the display of the computer are integrated into the same housing while retaining their original functions respectively. When the operating system of the all-in-one computer is in an operating mode, the operating system can be operated to output a screen image on the display, and the brightness value in the operating system can be controlled to adjust the brightness of the screen. When the operating system of the all-in-one computer is in a power-off mode, the all-in-one computer can be externally connected to an electronic device to act as a display to display the screen image of this electronic device. Under this situation, the brightness of the display of the all-in-one computer is controlled by the on-screen display menu, and the brightness of the display may be different significantly when the operating system is switched from the power-off mode back to the operating mode.

SUMMARY

In view of the above, an objective of the invention is to provide a brightness controlling method.

To achieve the above objective, the invention provides a brightness controlling method for an all-in-one computer. The all-in-one computer has an operating system, a control unit, a display unit, an on-screen display adjusting unit and a scaler. The on-screen display adjusting unit includes a first brightness value, and the operating system includes a first system brightness value. The brightness controlling method includes the following steps. First, the first brightness value is adjusted to a second brightness value, or the first system brightness value is adjusted to a second system brightness value. Then, when the first brightness value is adjusted to the second brightness value, the display unit displays a screen image according to the second brightness value, the scaler transmits a brightness synchronizing signal to the control unit, and the control unit synchronizes the first system brightness value to the second brightness value. When the first system brightness value is adjusted to the second system brightness value, the display unit displays the screen image according to the second system brightness value, and the scaler adjusts the first brightness value to the second system brightness value.

In one embodiment of the invention, when the first brightness value is adjusted to the second brightness value, the second brightness value is stored in a memory unit of the scaler.

In one embodiment of the invention, when the first system brightness value is adjusted to the second system brightness value, the second system brightness value is stored in a memory unit of the scaler.

In one embodiment of the invention, the memory unit is a non-volatile memory.

In one embodiment of the invention, the step of adjusting the first brightness value to a second brightness value or adjusting the first system brightness value to a second system brightness value further includes adjusting the first brightness value to the second brightness value according to a first input signal or adjusting the first system brightness value to the second system brightness value according to a second input signal.

In one embodiment of the invention, the first input signal is generated by a first input unit of the onscreen display adjusting unit, and the second input signal is generated by a second input unit.

In one embodiment of the invention, when the first brightness value is adjusted to the second brightness value and the operating system is in a non-operating mode, the display unit displays the screen image according to the second brightness value, and the second brightness value is stored in a memory unit of the scaler.

In one embodiment of the invention, when the operating system is switched from the non-operating mode to an operating mode, the scaler transmits the brightness synchronizing signal to the control unit, and the control unit synchronizes the first system brightness value to the second brightness value.

In one embodiment of the invention, the non-operating mode is a sleeping mode or a power-off mode.

The invention further provides an all-in-one computer including a storage unit, a display unit, a scaler, an on-screen display adjusting unit and a control unit. The storage unit stores an operating system, and the operating system includes a first system brightness value. The display is for displaying a screen image. The scaler is connected with the display unit for driving the display unit to display the screen image. The on-screen display adjusting unit is connected with the scaler and includes a first brightness value. The control unit is connected with the storage unit and the scaler. When the first brightness value is adjusted to a second brightness value, the display unit displays the screen image according to the second brightness value, the scaler transmits a brightness synchronizing signal to the control unit, and the control unit synchronizes the first system brightness value to the second brightness value. When the first system brightness value is adjusted to a second system brightness value, the display unit displays the screen image according to the second system brightness value, and the scaler adjusts the first brightness value to the second system brightness value.

In one embodiment of the invention, the on-screen display adjusting unit includes a first input unit for generating a first input signal, and the on-screen display adjusting unit adjusts the first brightness value to the second brightness value according to the first input signal.

In one embodiment of the invention, the all-in-one computer further includes a second input unit and a central processing unit. The second input unit is for generating a second input signal. The central processing unit is connected with the second input unit and the storage unit, and adjusts the first system brightness value to the second system brightness value according to the second input signal.

In one embodiment of the invention, the scaler has a memory unit for storing the second brightness value or the second system brightness value.

In one embodiment of the invention, when the first brightness value is adjusted to the second brightness value and the operating system is in a non-operating mode, the display unit displays the screen image according to the second brightness value, and the second brightness value is stored in the memory unit of the scaler.

In one embodiment of the invention, when the operating system is switched from the non-operating mode to an operating mode, the scaler transmits the brightness synchronizing signal to the control unit, and the control unit synchronizes the first system brightness value to the second brightness value.

In one embodiment of the invention, the non-operating mode is a sleeping mode or a power-off mode.

To sum up, the invention provides a brightness controlling method, in which the system brightness value of the operating system and the brightness value of the on-screen display adjusting unit are synchronized via the scaler. When one of the system brightness value and the brightness value of the on-screen display adjusting unit is adjusted, the other one can be adjusted synchronously so that the display unit displays with the same brightness. Therefore, a brightness controlling method having brightness synchronizing functionality can be realized via this arrangement.

DETAILED DESCRIPTION OF THE EMBODIMENT

The present invention will be apparent from the following detailed description, which proceeds with reference to the accompanying drawings, wherein the same references relate to the same elements.

Figure 1:
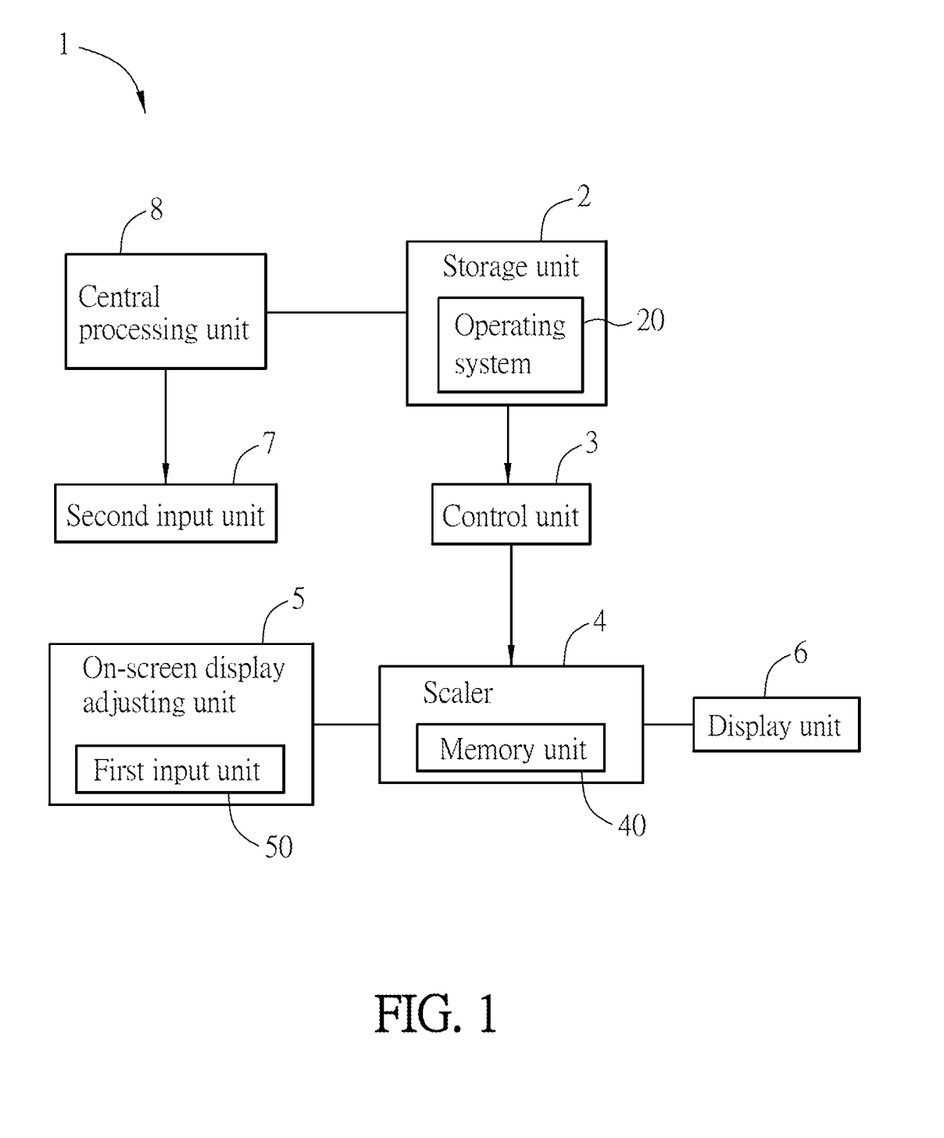
FIG. 1 is a schematic block diagram of an all-in-one computer of an embodiment of the invention.

FIG. 1 is a schematic block diagram of an all-in-one computer of an embodiment of the invention. Referring to FIG. 1, the all-in-one computer 1 of the embodiment includes a storage unit 2, a control unit 3, a scaler 4, an on-screen display adjusting units and a display unit 6.

The storage unit 2 may be a storage device such as a memory, a hard disc, an optical disc, etc.; the invention is not limited thereto. The storage unit 2 is stored with an operating system 20 that includes a first system brightness value. The display unit 6 is for displaying a screen image, and the display unit 6 may be a liquid crystal display, an organic light-emitting diode (OLED) display, a touch panel, or other similar devices; the invention is not limited thereto. The scaler 4 is connected with the display unit 6 for driving the display unit 6 to display the screen image. The on-screen display adjusting unit 5 is connected with the scaler 4, and includes the first brightness value. The control unit 3 is connected with the storage unit 2 and the scaler 4, and may be an embedded controller. The invention is not limited thereto. When using the all-in-one computer 1, the user can adjust the brightness of the display via the on-screen display adjusting unit 5 or the operating system 20.

When the first brightness value is adjusted to the second brightness value, the display unit 6 displays the screen image according to the second brightness value. The scaler 4 transmits the brightness synchronizing signal to the control unit 3, and the control unit 3 synchronizes the first system brightness value to the second brightness value. That is, when the user adjusts the brightness of the display via the on-screen display adjusting unit 5 and adjusts the first brightness value to the second brightness value, the display unit 6 displays the screen image according to the adjusted second brightness value, and the scaler 4 transmits the brightness synchronizing signal to the control unit 3. The control unit 3 synchronizes the first system brightness value in the operating system 20 to the second brightness value. Therefore, next time when the user needs to adjust the brightness of the display, the brightness of the display is adjusted with the second brightness value as the initial value regardless of whether the adjustment is performed via the on-screen display adjusting unit 5 or the operating system 20.

When the first system brightness value is adjusted to the second system brightness value, the display unit 6 displays the screen image according to the second system brightness value, and the scaler 4 adjusts the first brightness value to the second system brightness value. That is, when the user adjusts the brightness of the display via the operating system 20 and adjusts the first system brightness values to the second system brightness value, the display unit 6 can display the screen image according to the second system brightness value, and the scaler 4 transmits an adjusting signal to the on-screen display adjusting unit 5 to adjust the first brightness value to the second system brightness value. Therefore, next time when the user needs to adjust the brightness of the display, the brightness of the display is adjusted with the second system brightness value as the initial value regardless of whether the adjustment is performed via the on-screen display adjusting unit 5 or the operating system 20.

Referring to FIG. 1 again, the on-screen display adjusting unit 5 includes a first input unit 50 for generating a first input signal. The on-screen display adjusting unit 5 adjusts the first brightness value to the second brightness value according to the first input signal. The first input unit 50 may be a physical button around the display unit 6 or a virtual button on the display unit 6. The user can adjust the first brightness value by pressing the physical button or the virtual button.

The all-in-one computer 1 further includes a second input unit 7 and a central processing unit 8. The second input unit 7 is for generating a second input signal. The central processing unit 8 is connected with the second input unit 7 and the storage unit 2 for adjusting the first system brightness value to the second system brightness value according to the second input signal. The second input unit 7 may be a mouse or a touch panel, and the invention is not limited thereto. The second input unit 7 may adjust the system brightness value of the operating system 20 via the central processing unit 8.

The scaler 4 has a memory unit 40. The memory unit 40 is for storing the second brightness value or the second system brightness value. The memory unit 40 may be a non-volatile memory such as a read-only memory (ROM), an electrically erasable programmable read only memory (EEPROM), a flash memory, etc., so that when the all-in-one computer 1 is turned off, the second brightness value or the second system brightness value may be stored in the memory unit 40 and can be used next time when the all-in-one computer 1 is turned on.

The storage unit 2 may include an application program for brightness control (not shown in the drawings) to assist the control unit 3 to control the system brightness value in the operating system 20. The all-in-one computer 1 may further include a basic input-output system (BIOS) as the communication bridge between the application program for brightness control and the control unit 3.

When the first brightness value is adjusted to the second brightness value and the operating system 20 is in a non-operating mode, the display unit 6 displays the screen image according to the second brightness value, and the second brightness value is stored in the memory unit 40 of the scaler 4. In detail, the all-in-one computer 1 may be externally connected to an electronic device when the operating system 20 is in the non-operating mode, and the all-in-one computer 1 acts as a displaying device to display the screen image of this electronic device. Under this situation, after the user adjusts the first brightness value to the second brightness value via the on-screen display adjusting unit 5, the display unit 6 of the all-in-one computer 1 may display the screen image according to the second brightness value, and the second brightness value is stored in the memory unit 40 of the scaler 4. The non-operating mode may be a sleeping mode or a power-off mode.

When the operating system 20 is switched from the non-operating mode to an operating mode, the scaler 4 transmits the brightness synchronizing signal to the control unit 3, and the control unit 3 synchronizes the first system brightness value to the second brightness value. That is, when the operating system 20 is switched from the non-operating mode to the operating mode, the scaler 4 transmits the brightness synchronizing signal to the control unit 3, so that the control unit 3 retrieves the second brightness value stored in the storage unit 2 and synchronizes the first system brightness value of the operating system 20 to the second brightness value.

Figure 2:
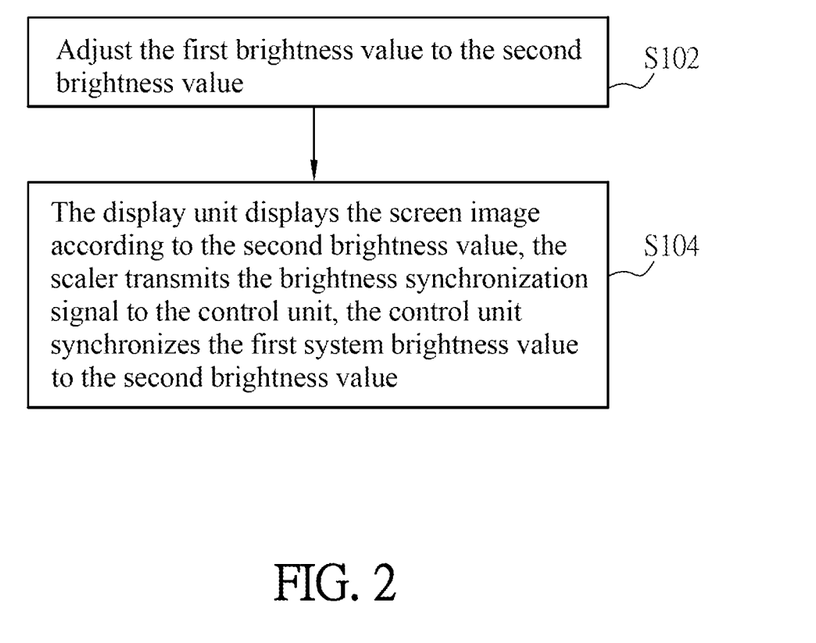
FIG. 2 is a flowchart of the brightness controlling method according to an embodiment of the invention.

FIG. 2 is a flowchart of the brightness controlling method according to an embodiment of the invention. Referring to FIG. 1 and FIG. 2 simultaneously, the brightness controlling method of the embodiment is suitable for an all-in-one computer 1. The all-in-one computer 1 has a control unit 3, a scaler 4, an on-screen display adjusting unit 5, a display unit 6 and an operating system 20. The on-screen display adjusting unit 5 includes a first brightness value, and the operating system 20 includes a first system brightness value. When using the all-in-one computer 1, the user can adjust the brightness of the display via the on-screen display adjusting unit 5 or the operating system 20.

The brightness controlling method adjusts the brightness of the display via the on-screen display adjusting unit 5, and includes the following steps. First, the first brightness value is adjusted to the second brightness value (step S102). Then, when the first brightness value is adjusted to the second brightness value, the display unit 6 displays the screen image according to the second brightness value, and the scaler 4 transmits a brightness synchronizing signal to the control unit 3. The control unit 3 synchronizes the first system brightness value to the second brightness value (step S104).

Step S102 of the brightness controlling method further includes the following step: adjusting the first brightness value to the second brightness value according to a first input signal. The first input signal is generated by the first input unit 50 of the on-screen display adjusting unit 5. The first input unit 50 may be a physical button around the display unit 6 or a virtual button on the display unit 6. The user can adjust the first brightness value by pressing the physical button or the virtual button.

In step S104 of the brightness controlling method, when the first brightness value is adjusted to the second brightness value, the second brightness value is stored in a memory unit 40 of the scaler 4. The memory unit 40 may be a non-volatile memory, such as a read-only memory (ROM), an electrically erasable programmable read only memory (EEPROM), a flash memory, etc., so that when the all-in-one computer 1 is turned off, the second brightness value may be stored in the memory unit 40 and can be used next time when the all-in-one computer 1 is turned on.

Figure 3:
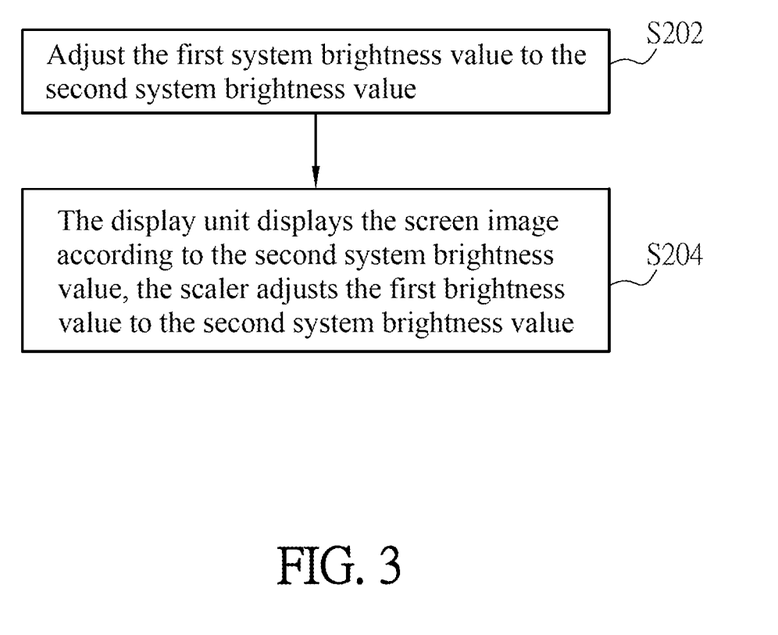
FIG. 3 is another flowchart of the brightness controlling method according to an embodiment of the invention.

FIG. 3 is another flowchart of the brightness controlling method according to an embodiment of the invention. Referring to FIG. 3, the brightness controlling method adjusts the brightness of the display via the operating system 20, and includes the following steps. First, the first system brightness value is adjusted to the second system brightness value (step S202). Then, when the first system brightness value is adjusted to the second system brightness value, the display unit 6 displays the screen image according to the second system brightness value, and the scaler 4 adjusts the first brightness value to the second system brightness value (step S204).

Step S202 of the brightness controlling method further includes the following step: adjusting the first system brightness value to the second system brightness value according to a second input signal. The second input signal is generated by the second input unit 7. The second input unit 7 may be a mouse or a touch pad, and the invention is not limited thereto. The second input unit 7 may adjust the system brightness value of the operating system 20 via the central processing unit 8.

In step S204 of the brightness controlling method, when the first system brightness value is adjusted to the second system brightness value, the second system brightness value is stored in the memory unit 40 of the scaler 4. The memory unit 40 may be a non-volatile memory, such as a read-only memory (ROM), an electrically erasable programmable read only memory (EEPROM), a flash memory, etc., so that when the all-in-one computer 1 is turned off, the second brightness value may be stored in the memory unit 40 and can be used next time when the all-in-one computer 1 is turned on.

Figure 4:
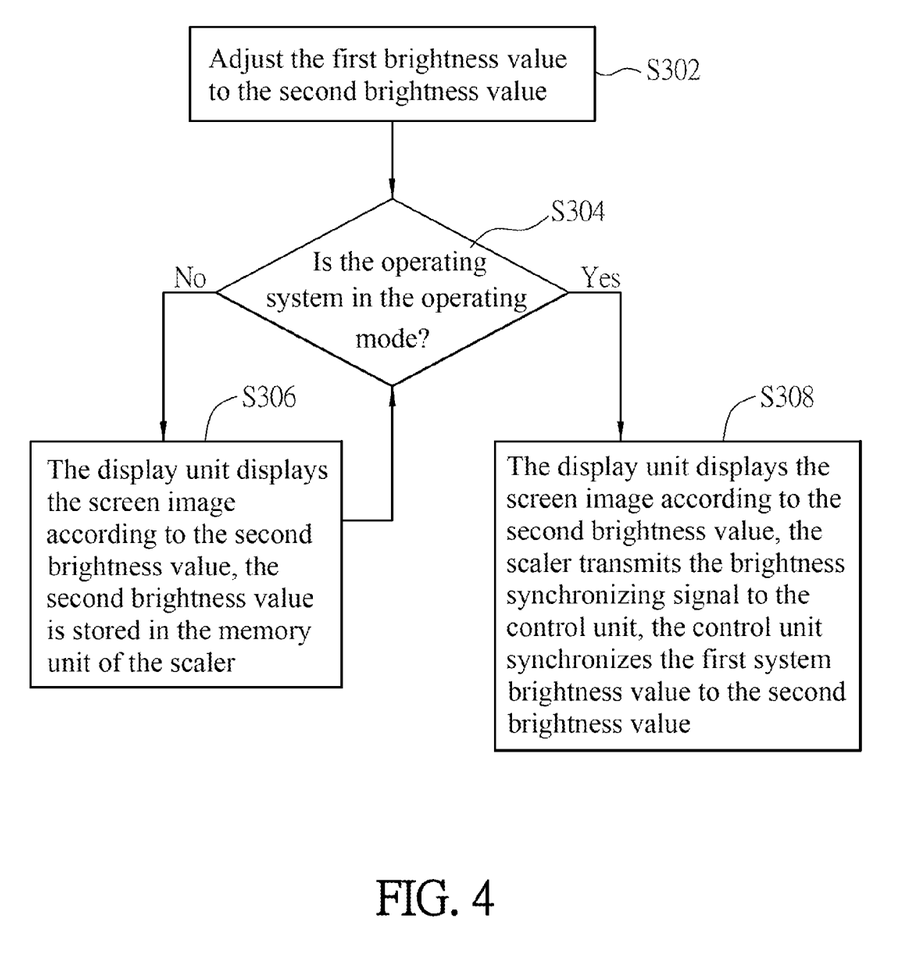
FIG. 4 is still another flowchart of the brightness controlling method according to an embodiment of the invention.

FIG. 4 is still another flowchart of the brightness controlling method according to an embodiment of the invention. Referring to FIG. 4, the brightness controlling method adjusts the brightness of the display via the on-screen display adjusting unit 5, and includes the following steps. First, the first brightness value is adjusted to the second brightness value (step S302). Then, when the first brightness value is adjusted to the second brightness value, it is determined whether the operating system 20 is in the operating mode or not (step S304). When the first brightness value is adjusted to the second brightness value and the operating system 20 is in a non-operating mode, the display unit 6 displays the screen image according to the second brightness value, and the second brightness value stored in the memory unit 40 of the scaler 4 (step S306). When the operating system 20 is switched from the non-operating mode to the operating mode, the scaler 4 transmits the brightness synchronizing signal to the control unit 3, and the control unit 3 synchronizes the first system brightness value to the second brightness value (step S308). In the brightness controlling method, the non-operating mode may be the sleeping mode or the power-off mode.

In detail, the all-in-one computer 1 may be externally connected to an electronic device when the operating system 20 is in the non-operating mode, and the all-in-one computer 1 acts as a displaying device to display the screen image of this electronic device. Under this situation, after the user adjusts the first brightness value to the second brightness value via the on-screen display adjusting unit 5, the display unit 6 of the all-in-one computer 1 may display the screen image according to the second brightness value, and the second brightness value is stored in the memory unit 40 of the scaler 4. When the operating system 20 is switched from the non-operating mode to an operating mode, the scaler 4 transmits the brightness synchronizing signal to the control unit 3, and the control unit 3 retrieves the second brightness value stored in the memory unit 40 and synchronizes the first system brightness value to the second brightness value.

To sum up, in the brightness controlling method of the invention, the synchronization of the brightness value can be achieved by the scaler when the brightness value is adjusted via the operating system or the on-screen display adjusting unit. This prevents the gap of the brightness of the display due to the use of different ways to adjust brightness. Therefore, a brightness controlling method having brightness synchronization functionality can be realized with such arrangement.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A brightness controlling method with brightness synchronizing functionality for an all-in-one computer, the all-in-one computer having an operating system, a controller, a display, an on-screen display (OSD) adjuster and a scaler, the OSD adjuster including a first brightness value, the operating system including a first system brightness value, the method comprising:
   adjusting the first brightness value to a second brightness value or adjusting the first system brightness value to a second system brightness value;
   when the first brightness value is adjusted to the second brightness value, the display displaying a screen image according to the second brightness value, the scaler transmitting a brightness synchronizing signal to the controller, the controller synchronizing the first system brightness value to the second brightness value; and
   when the first system brightness value is adjusted to the second system brightness value, the display displaying the screen image according to the second system brightness value, the scaler adjusting the first brightness value to the second system brightness value.

2. The brightness controlling method with brightness synchronizing functionality according to claim 1, wherein when the first brightness value is adjusted to the second brightness value, the second brightness value is stored in a memory of the scaler.

3. The brightness controlling method with brightness synchronizing functionality according to claim 2, wherein the memory is a non-volatile memory.

4. The brightness controlling method with brightness synchronizing functionality according to claim 1, wherein when the first system brightness value is adjusted to the second system brightness value, the second system brightness value is stored in a memory of the scaler.

5. The brightness controlling method with brightness synchronizing functionality according to claim 4, wherein the memory is a non-volatile memory.

6. The brightness controlling method with brightness synchronizing functionality according to claim 1, wherein the step of adjusting the first brightness value to a second brightness value or adjusting the first system brightness value to a second system brightness value further comprises:
   adjusting the first brightness value to the second brightness value according to a first input signal or adjusting the first system brightness value to the second system brightness value according to a second input signal.

7. The brightness controlling method with brightness synchronizing functionality according to claim 6, wherein the first input signal is generated by an input interface of the OSD adjuster, and the second input signal is generated by a input device.

8. The brightness controlling method with brightness synchronizing functionality according to claim 1, wherein when the first brightness value is adjusted to the second brightness value and the operating system is in a non-operating mode, the display displays the screen image according to the second brightness value, and the second brightness value is stored in a memory of the scaler.

9. The brightness controlling method with brightness synchronizing functionality according to claim 8, wherein when the operating system is switched from the non-operating mode to an operating mode, the scaler transmits the brightness synchronizing signal to the controller, and the controller, synchronizes the first system brightness value to the second brightness value.

10. The brightness controlling method with brightness synchronizing functionality according to claim 9, wherein the non-operating mode is a sleeping mode or a power-off mode.

11. An all-in-one computer comprising:
   a storage device storing an operating system, the operating system including a first system brightness value;
   a display for displaying a screen image;
   a scaler connected with the display for driving the display to display the screen image;
   an on-screen display (OSD) adjuster connected with the scaler and including a first brightness value; and
   a controller, connected with the storage device and the scaler,
   wherein
   when the first brightness value is adjusted to a second brightness value, the display displays the screen image according to the second brightness value, the scaler transmits a brightness synchronizing signal to the controller, and the controller synchronizes the first system brightness value to the second brightness value, and
   when the first system brightness value is adjusted to a second system brightness value, the display displays the screen image according to the second system brightness value, and the scaler adjusts the first brightness value to the second system brightness value.

12. The all-in-one computer according to claim 11, wherein the OSD adjuster comprises an input interface for generating a first input signal, the OSD adjuster adjusts the first brightness value to the second brightness value according to the first input signal.

13. The all-in-one computer according to claim 12, further comprising:
an input device for generating a second input signal; and
a central processing unit connected with the input device and the storage device, the central processing unit adjusting the first system brightness value to the second system brightness value according to the second input signal.

14. The all-in-one computer according to claim 11, wherein the scaler has a memory for storing the second brightness value or the second system brightness value.

15. The all-in-one computer according to claim 14, wherein when the first brightness value is adjusted to the second brightness value and the operating system is in a non-operating mode, the display displays the screen image according to the second brightness value, the second brightness value is stored in the memory of the scaler.

16. The all-in-one computer according to claim 15, wherein when the operating system is switched from the non-operating mode to an operating mode, the scaler transmits the brightness synchronizing signal to the controller, and the controller synchronizes the first system brightness value to the second brightness value.

17. The all-in-one computer according to claim 16, wherein the non-operating mode is a sleeping mode or a power-off mode.

* * * * *